United States Patent [19]

Hayashi et al.

[11] Patent Number: 5,608,699
[45] Date of Patent: Mar. 4, 1997

[54] INFORMATION RECORDING AND REPRODUCING APPARATUS WHICH PREVENTS WEAR OF A SLIDING CARD CARRIAGE

[75] Inventors: Hiroshi Hayashi, Sakado; Tadao Ogino, Higashi-Matsuyama; Minoru Matsuo, Kawagoe, all of Japan

[73] Assignee: Nippon Conlux Co., Ltd., Tokyo, Japan

[21] Appl. No.: 200,740

[22] Filed: Feb. 23, 1994

[30] Foreign Application Priority Data

Feb. 26, 1993 [JP] Japan .................................. 5-038362
Jun. 4, 1993 [JP] Japan .................................. 5-134612

[51] Int. Cl.$^6$ .............................. G11B 7/00; G11B 11/00
[52] U.S. Cl. .................... 369/13; 369/44.14; 369/44.39
[58] Field of Search ............................... 369/15, 13, 100, 369/111, 258, 271, 275.3, 264, 44.39, 44.14, 244, 215, 220; 360/73.09, 88, 114, 59

[56] References Cited

U.S. PATENT DOCUMENTS 3,706,860 12/1972 Burbank, III ........................... 360/88
4,048,476 9/1977 Lawter et al. .................... 360/73.09 X
4,916,687 4/1990 Endo ........................................ 369/111

FOREIGN PATENT DOCUMENTS

| 0203788 | 12/1986 | European Pat. Off. . |
| 0296590 | 12/1988 | European Pat. Off. . |
| 0508111 | 10/1992 | European Pat. Off. . |
| 1099201 | 9/1957 | Germany . |
| 3034517 | 9/1980 | Germany . |
| 3837067 | 5/1989 | Germany . |
| 61-73260 | 4/1986 | Japan . |
| 0132264 | 6/1987 | Japan . |

*Primary Examiner*—Ali Neyzari
*Attorney, Agent, or Firm*—Loeb & Loeb LLP

[57] ABSTRACT

Apparatus for recording and reproducing information prevents the bearing surface of an auxiliary bearing of a card carriage which is in sliding contact with an auxiliary guide rail from being locally worn. A main guide rail and the auxiliary guide rail are spaced in the same plane. The axis of the auxiliary guide rail is oblique at a predetermined very small angle to the axis of the main guide rail. The auxiliary bearing has a bearing bore having a slot-shaped cross section. Portions of the bearing surface of the bearing bore which are in contact with the auxiliary guide rail are displaced transversely to the direction of the stroke of the card carriage during the stroke.

4 Claims, 6 Drawing Sheets

INFORMATION RECORDING AND REPRODUCING APPARATUS WHICH PREVENTS WEAR OF A SLIDING CARD CARRIAGE

BACKGROUND OF THE INVENTION

1. Field of the Invention

The present invention relates to an information recording and reproducing apparatus and more particularly to an information recording and reproducing apparatus in which a card carriage is guided by a pair of guide rails to reciprocate through a predetermined stroke.

2. Description of the Related Art

In an information recording and reproducing system using an optical memory card as an information storage medium, the optical memory card is moved linearly forward and rearward relative to an optical recording and reproducing head and the optical head scans a data track on the optical memory card to write and read information into and out of the optical memory card.

In such conventional system, a drive means such as a linear motor moves a card carriage in rectangular form through a predetermined stroke at a high speed so that the optical memory card carriage is guided by parallel main and auxiliary guide rails having circular cross sections. Conventionally, the main and auxiliary rails extend in a travel direction of the optical memory card, and bearings of the card carriage having bearing bores of the round cylindrical form engage the two guide rails. Since it is difficult to obtain an accurate parallelism of the two guide rails, it is difficult to smoothly move the card carriage. In order to overcome this drawback, a technique has been developed by which the card carriage engages the main guide rail by means of a main plain bearing having a bore with the edge surface in close contact with the cylindrical surface of the main guide rail and by which the card carriage engages the auxiliary guide rail by means of an auxiliary plain bearing having a U-shaped groove, so that the bottom surface of the groove is in sliding contact with the auxiliary guide rail.

The prior art information recording and reproducing system has the following drawback. While the main plain bearing is sufficiently durable for longtime service since the main plain bearing has a round cylindrical bore the overall edge surface of which is in sliding contact with the main guide rail, the auxiliary plain bearing is in line contact with a certain portion of the auxiliary guide rail. Therefore, wearing due to this line contact tends to occur during use of the apparatus and the auxiliary plain bearing has poor durability. The wearing makes it difficult to maintain the level of the upper surface of the card carriage at an initial level, so that a predetermined distance for recording and reproducing data between the optical recording and reproducing head and the optical memory card cannot be accurately maintained. Since the card carriage experiences oscillation due to the wearing at a certain position in the bearing surface of the auxiliary plain bearing, the card carriage does not stably reciprocate. This adversely affects recording and reproduction of the information on and from the optical memory card.

In addition, the card carriage is usually mounted within an apparatus case. The front portion of the apparatus case has a front panel mounted thereon and having a card receiving slot.

Recently, there has been a tendency to reduce the thickness of the apparatus case tends. This entails the drawback that a reduced distance between a mounting surface to which the apparatus is mounted and the card receiving slot may result in contact a of hand or fingers of an operator holding the optical memory card with the mounting surface. Therefore, it is difficult to insert the optical memory card into the card receiving slot.

SUMMARY OF THE INVENTION

A primary object of the present invention is to provide an information recording and reproducing apparatus which overcomes the drawback in the prior art and which prevents a portion of an auxiliary plain bearing of a card carriage in contact with an auxiliary guide rail from being locally worn thereby precluding oscillation due to the local wearing and enabling stable movement of the card carriage forward and rearward over a long period of time.

Another object of the present invention is to provide an information recording and reproducing apparatus having a card receiving slot into which an operator can insert an optical memory card without fretting a data storage region in the optical memory card.

In order to achieve the primary object, a first embodiment of the present invention comprises a chassis; a main guide rail and an auxiliary guide rail spaced on an upper surface of said chassis, the main guide rail and the auxiliary guide rail respectively having circular cross sections and cylindrical surfaces; a card carriage capable of retaining an optical memory card, the card carriage being mounted on the main and auxiliary guide rails and linearly movable along the main and auxiliary guide rails; a main guide bearing and an auxiliary plain bearing for supporting the card carriage; head carriage movable perpendicularly to the direction of a movement of the card carriage; and an optical recording and reproducing head, fixedly mounted on the head carriage, for recording and reproducing data into and out of the optical memory card. The axis of said auxiliary guide rail is positioned in the same plane as the axis of said main guide rail. The axis of said auxiliary guide rail is oblique at a predetermined very small angle to the axis of the main guide rail. The main guide bearing has a round cylindrical bearing surface fitting the cylindrical surface of the main guide rail. The auxiliary plain bearing has a bearing bore having a slot-shaped cross section. Opposite edge surfaces of the bearing bore of the auxiliary bearing are in contact with the cylindrical surface of the auxiliary guide rail.

The auxiliary bearing may have a U-shaped bearing surface the opposite portions of which are in contact with the cylindrical surface of the auxiliary guide rail.

In the operation of the first embodiment, since the auxiliary guide rail is oblique at a predetermined very small angle to the main guide rail, contact portions of the bearing surfaces of the auxiliary bearing are displaced transversely from the axis of the main guide rail during the stroke of the card carriage. This displacement prevents the bearing surfaces of the auxiliary bearing from being locally linearly worn thereby preventing an oscillation of the card carriage during the forward and rearward strokes of the card carriage and providing for stable forward and rearward strokes of the card carriage.

Another embodiment of the present invention comprises a front panel having a card receiving horizontally extending slot having an upper edge with a concave surface and a lower edge; an optical memory card including a data storage region and capable of being inserted into the card receiving slot; an optical head recording data into and reproducing data out of the data storage region in the optical memory card; a card carriage retaining the optical memory card and transferring the optical memory card between the card receiving slot and the optical head; and a card receiver adjoining the lower edge of the card receiving slot, an upper surface of the card receiver being flush with the lower edge surface of the card receiving slot, the card receiver projecting forward from the front panel.

In the operation of the second embodiment, since the front panel includes the card receiving plate in front of the card receiving slot, an operator approaches the optical memory card from above the card receiving slot down to the card receiving slot in front of the front panel and contacts the front end of the optical memory card with the card receiving plate. This eliminates the need for a parallel movement 0f the optical memory card to the mounting surface (to which the information recording and reproducing apparatus is mounted) for inserting it into the card receiving slot. This also prevents a hand or fingers of the operator holding the optical memory card from contacting the mounting surface.

The upper edge of the card receiving slot may have a concave surface. This arrangement protects the data storage region in the optical memory card from being fretted due to a friction between the data storage region the upper edge line of the card receiving slot.

DESCRIPTION OF THE PREFERRED EMBODIMENTS

Figure 1:
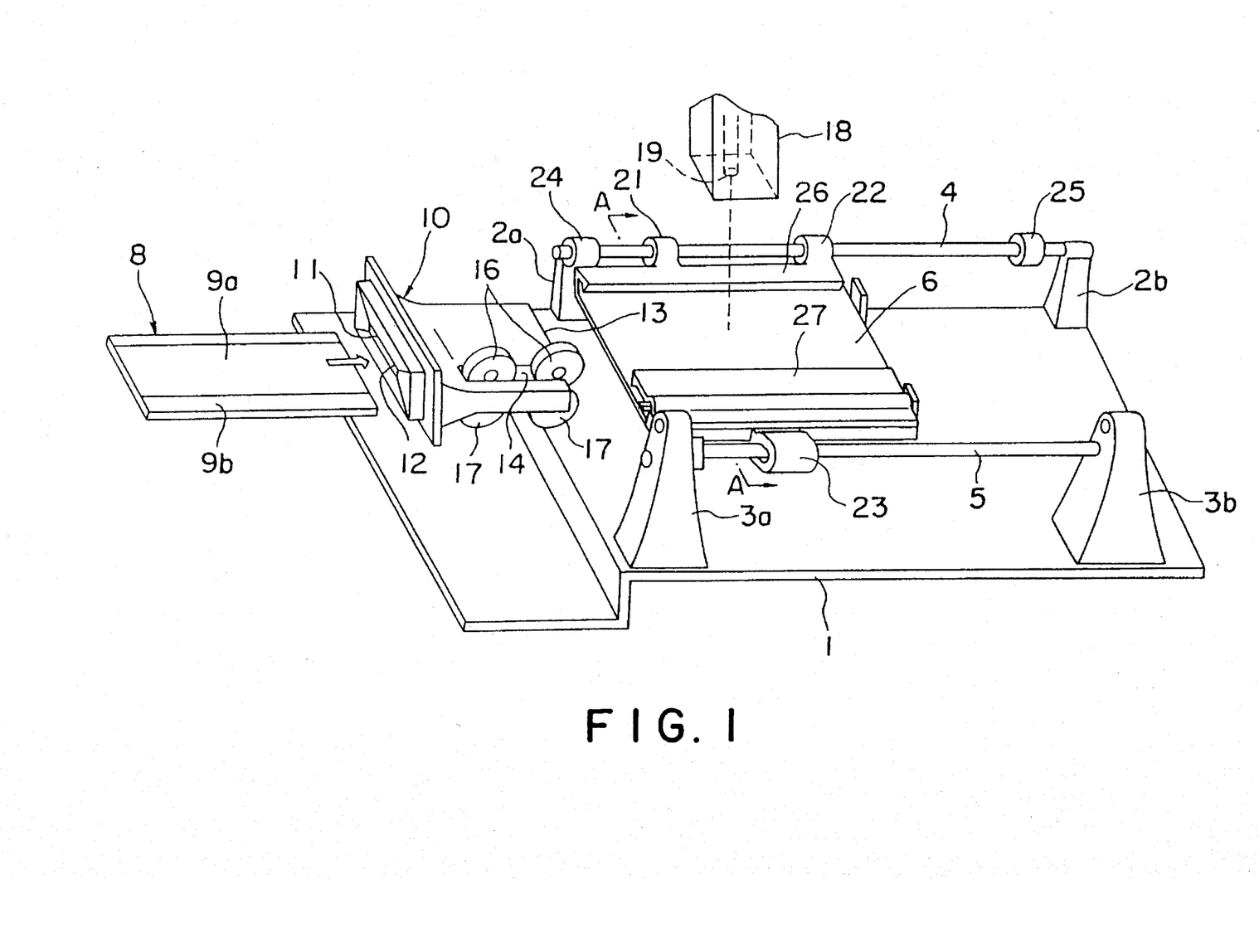
FIG. 1 is a perspective view of an information recording and reproducing apparatus according to a first embodiment of the present invention.
Figure 4:
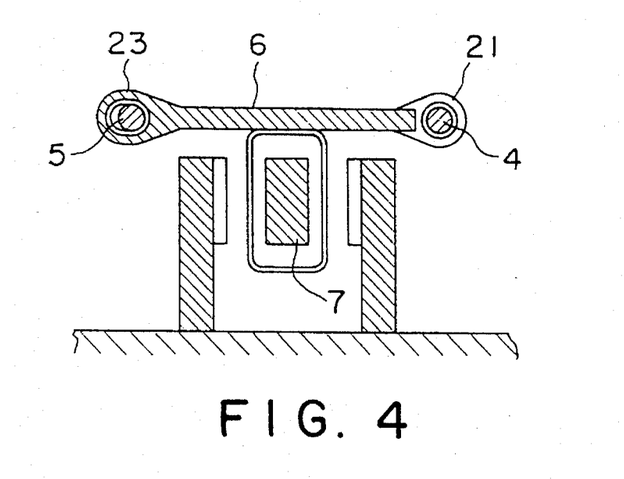
FIG. 4 is a sectional view taken along the line D—D in FIG. 3.

FIG. 1 is a perspective view of an information recording and reproducing apparatus according to a first embodiment of the present invention. A rectangular chassis is indicated at 1. Four corners of the chassis 1 have upright brackets 2a, 2b, 3a and 3b mounted thereon. A main guide rail 4 has a circular cross section and horizontally extends between the brackets 2a and 2b. An auxiliary guide rail 5 has a circular cross section and horizontally extends between the brackets 3a and 3b. The guide rails 4 and 5 are positioned so that their axes lie in the same horizontal plane and so that the axis of the auxiliary guide rail 5 is oblique at a predetermined very small angle θ to the axis of the main guide rail 4. Thus, the main guide rail 4 and the auxiliary guide rail 5 are not parallel to each other and extensions thereof intersect each other at a certain point. A card carriage 6 in the form of a rectangular board is mounted so as to be longitudinally slidably on the main guide rail 4 and the auxiliary guide rail 5. As seen in FIG. 4, a linear motor 7 moves the card carriage 6 between a front stop position and a rearmost stop position. An upper surface of the card carriage 6 retains a rectangular optical memory card 8 in a predetermined position. As shown in FIG. 1,-the optical memory card 8 includes a rectangular data storage region 9a as a central region extending along the longitudinal axis thereof and data-free or guard regions 9b adjoining the opposite longitudinal peripheries of the data storage region 9a.

A front mask unit 10 is mounted by means of a bracket (not shown) on the upper surface of a stepped-down floor extending forward from the front end of the chassis 1. The front mask unit 10 has a card passage 11 extending through it along the antero-posterior axis of it. The front end of the card passage 11 has a card receiving slot 12. The rear end of the card passage 11 has a card discharging slot 13. The optical memory card 8 is inserted into the card receiving slot 12, released through the card discharging slot 13 and transferred to the upper surface of the card carriage 6. The front mask unit 10 has a slot 14 extending along the antero-posterior axis thereof. A feed roller set which pinches the optical memory card 8 and delivers it to the upper surface of the card carriage 6 is mounted in the slot 14. The feed roller set comprises a pair of drive rollers 16 driven by an electrical motor and belt assembly (not shown), and follower rollers 17 mating the drive rollers 16. The drive rollers 16 and the follower rollers 17 serve as pinch rollers pinching the optical memory card 8. Once an operator has inserted the optical memory card 8 into the card passage 11 to a predetermined depth, a card sensor (not shown) provided in the card receiving slot 12 senses the optical memory card 8 and produces a signal for moving the electrical motor. Thus, the electrical motor rotates the drive rollers 16 and in turn the feed roller set delivers the optical memory card 8 to the upper surface of the card carriage 6 through the card discharging slot 13.

Above the card carriage 6, an optical recording and reproducing head 18 is supported on a head carriage frame (not shown). A linear motor (not shown) moves the optical head 18 up and down perpendicularly to the travel direction of the card carriage 6. The optical head 18 includes a laser source 19. The laser source 19 transmits a laser beam for writing and reading data to the data storage region 9a in the optical memory card 8.

Figure 2:
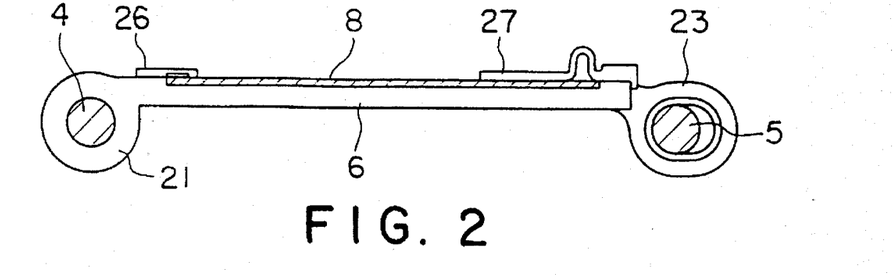
FIG. 2 is a sectional view taken along the line A—A in FIG. 1, showing a card retention state of card retainers of the information recording and reproducing apparatus of FIG. 1.

As shown in FIGS. 1 and 2, a main-guide-rail-side edge of the card carriage 6 has two main plain bearings 21 and 22. Each of the main plain bearings 21 and 22 has a round cylindrical bearing bore and is in sliding contact with the main guide rail 4. On the other hand, an auxiliary-guide-rail-side edge of the card carriage 6 has an auxiliary plain bearing 23. The auxiliary plain bearing 23 has a bearing bore having a generally elliptic cross section and is in contact with the auxiliary guide rail 5. The edge of the bearing bore of the auxiliary plain bearing 23 includes flat upper and lower surfaces in contact with the auxiliary guide rail 5. The card carriage 6 is movable forward and rearward along the main and auxiliary guide rails 4 and 5 so that the main plain bearings 21 and 22 are in sliding contact with the main guide rail 4 and the auxiliary plain bearing 23 is in sliding contact with the auxiliary guide rail 5.

The main guide rail 4 has two stop bushings 24 and 25 mounted thereon. The front stop position of the card carriage 6 is defined as a position in which the position of the card carriage 6 is nearest to the card discharging slot 13 of the front mask unit 10 in the stroke of the card carriage 6. The front edge surface of the main plain bearing 21 contacts the front stop bushing 24 to delimit the forward stroke of the card carriage 6. On the other hand, the rearmost stop position of the card carriage 6 is defined as a position in which the position of the card carriage 6 is remotest from the card discharging slot 13 in the stroke of the card carriage 6. The rear edge surface of the main plain bearing 22 contacts the rearmost stop bushing 25 to delimit the rearward stroke of the card carriage 6. Thus, the card carriage 6 reciprocates between the front and rearmost stop positions.

The main-guide-rail-side edge of the card carriage 6 has a rigid card retainer plate 26. The auxiliary-guide-rail-side edge of the card carriage 6 has a flexible card retainer plate 27. The card retainer plates 26 and 27 can retain the optical memory card 8 on the upper surface of the card carriage 6.

Figure 3:
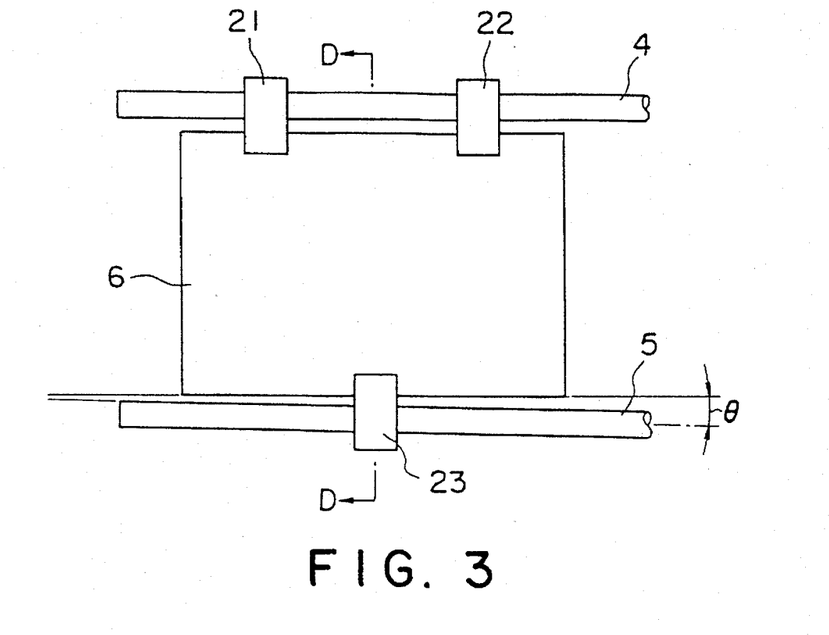
FIG. 3 is a plan view of a card carriage in a front stop position.
Figure 5:
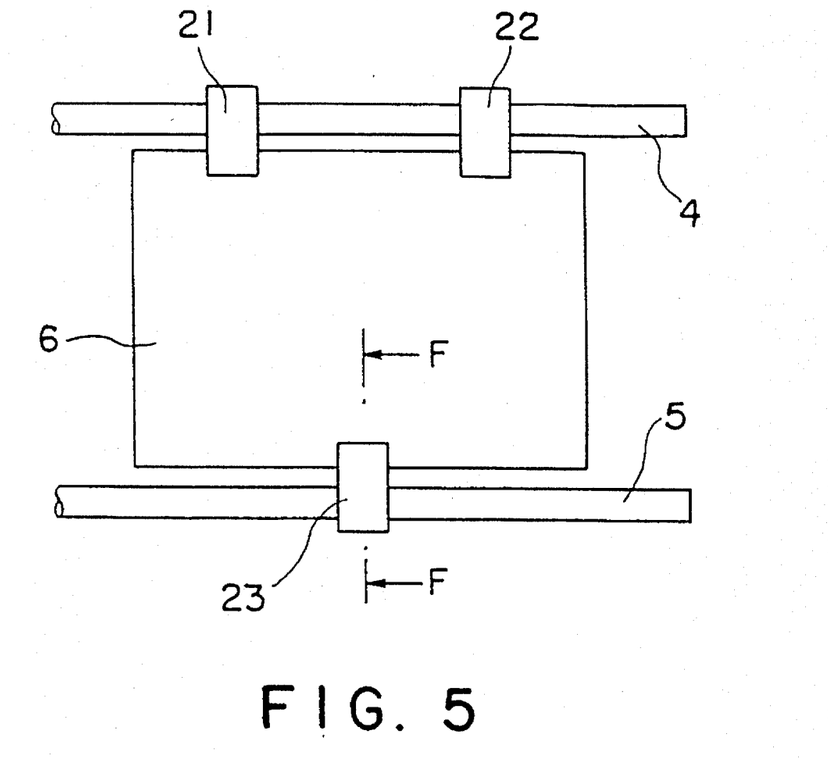
FIG. 5 is a plan view of a card carriage in a rearmost stop position.
Figure 6:
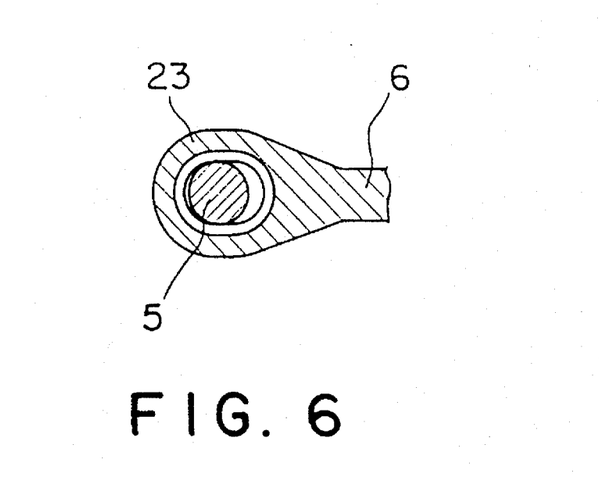
FIG. 6 is a sectional view taken along the line F—F in the FIG. 5.

In operation, contact portions of the upper and lower bearing surfaces of the auxiliary plain bearing 23 are displaced transversely from the axis of the main guide rail 4 during the stroke of the card carriage 6 between the front and rearmost stop positions. FIGS. 3 and 4 show the card carriage 6 in the front stop position. FIGS. 5 and 6 show the card carriage 6 in the rearmost stop position. As shown especially in FIGS. 4 and 6, the contact portions of the upper and lower bearing surfaces of the auxiliary plain bearing 23 are displaced transversely to the direction of the stroke of the card carriage 6. Thus, the lengths of the upper and lower bearing surfaces of the auxiliary plain bearing 5 must cover at least a transverse displacement of $\cos(90-\theta)°$ during the stroke of the card carriage 6 with the auxiliary plain guide rail 5 oblique at a very small angle $\theta°$ to the main plain guide rail 4. The shape of the cross section of the bearing bore of the auxiliary plain bearing 23 is not restricted to a general ellipsis having upper and lower flat sides but may be, e.g., a U-shape having upper and lower flat sides. Since the open ends of the cross section of such U-shaped auxiliary plain bearing may gradually increase during long periods of use, the auxiliary plain bearing having a bearing bore with such elliptic cross section can ensure more stable forward and rearward strokes of the card carriage 6.

FIGS. 7–11 show an information recording and reproducing apparatus according to a second embodiment of the present invention.

Figure 7:
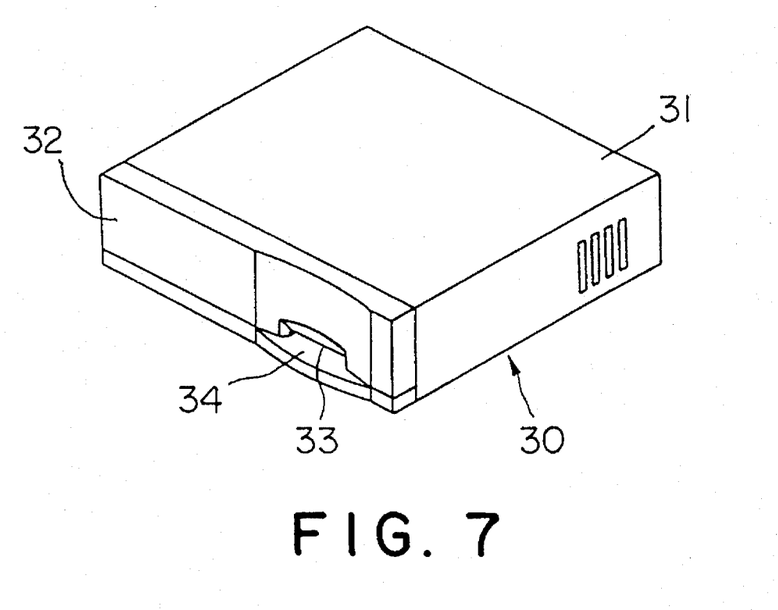
FIG. 7 is a perspective view of an information recording and reproducing apparatus according to a second embodiment of the present invention.

As shown in FIG. 7, the rectangular information recording and reproducing apparatus which is mounted on a mounting surface 30 has a reduced thickness. The apparatus comprises a main casing 31 in the form of a box. The front portion of the main casing 31 has a front panel 32 mounted thereon. The opposite sidewalls of the main casing 31 have ventilating openings.

Figure 8:
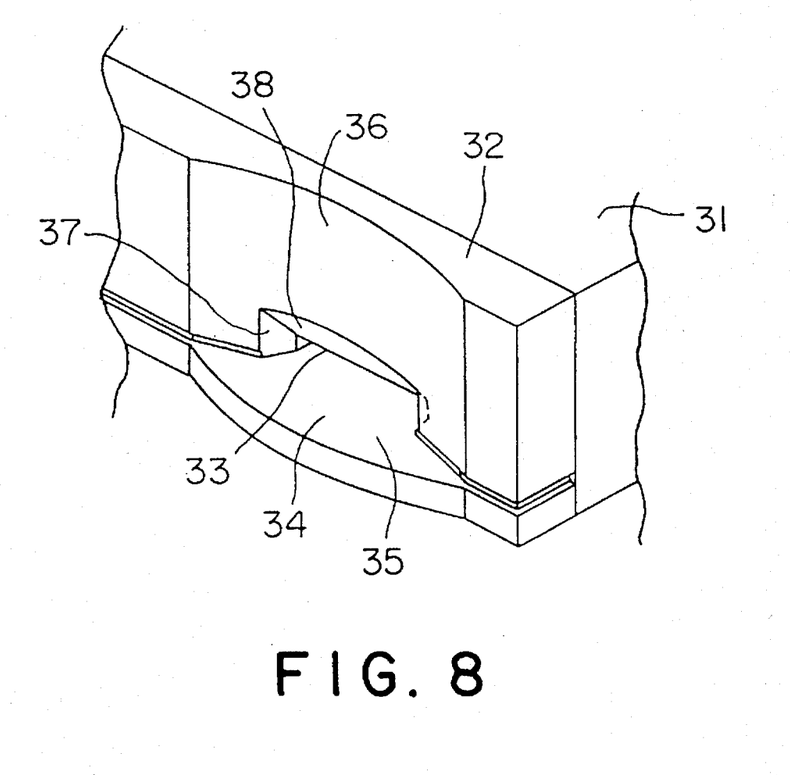
FIG. 8 is a perspective view of part of a front panel of the information recording and reproducing apparatus of FIG. 7.
Figure 9:
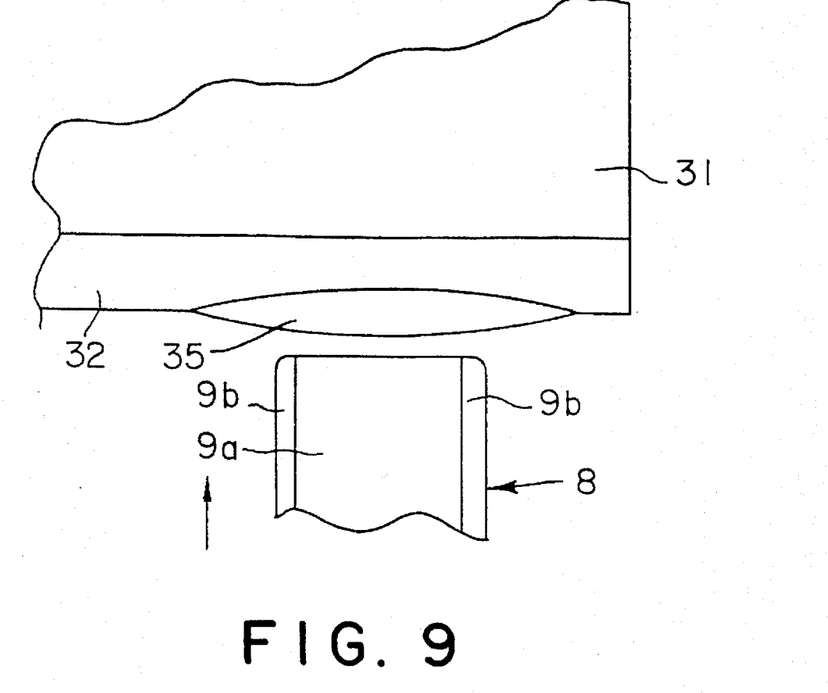
FIG. 9 is a plan view of part of the front panel of FIG. 7, showing an a optical memory card being inserted into the information recording and reproducing apparatus of FIG. 7.

As shown in FIGS. 8 and 9, the front panel 32 has a card receiving slot 33. The operator inserts the optical memory card 8 into the apparatus through the card receiving slot 33. The front panel 32 has a card receiving plate 34 adjoining the lower edge of the card receiving slot 33. The card receiving plate 34 has a convex front edge projecting forward from the front panel 32. The upper surface 35, receiving and contacting the optical memory card 8, of the card receiving plate 34 is flat and flush with the bottom surface of the card receiving slot 33. The upper surface 35 extends forward from the lower edge of the card receiving slot 33 and is generally sector-shaped. The maximum length of the card receiving plate 34 is larger than the length of the card receiving slot 33. A portion of the front panel 32 extending upward from the upper edge of the card receiving slot 33 has a concave surface 36 in the inner cylindrical form. The concave surface 36 has a length equal to the maximum length of the card receiving plate 34.

The side edges of the card receiving slot 33 have bevelled surfaces 37. The upper edge of the card receiving slot 33 has a bevelled surface 38. These bevelled surfaces 37 and 38 facilitate insertion by operator of the optical memory card 8 into the card receiving slot 33. Therefore, a boundary between the concave surface 36 and the upper bevelled surface 38 forms the upper edge line of the card receiving slot 33. Since the concave surface 36 swells in a direction of the insertion of the optical memory card 8, the upper edge line of the card receiving slot 33 is convex upward.

Figure 10:
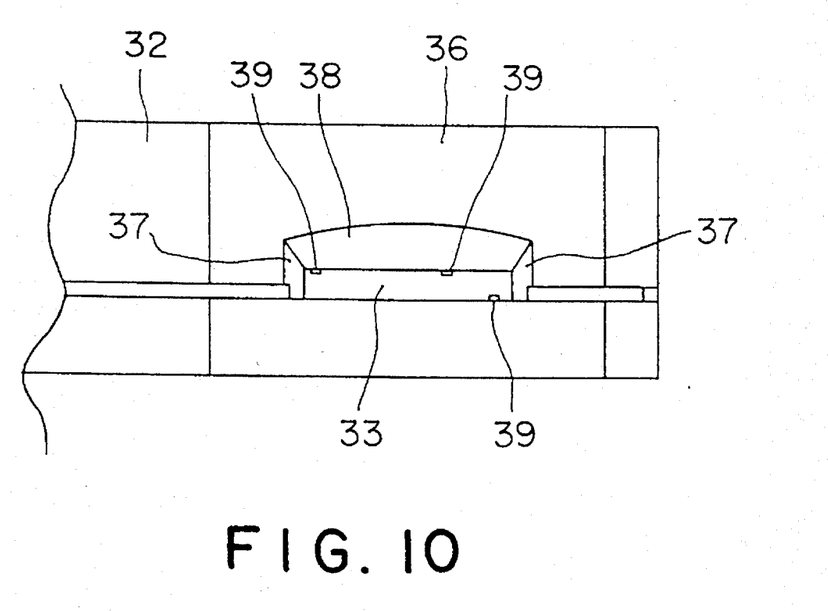
FIG. 10 is a front elevation of the front panel of FIG. 7.

As shown in FIG. 10, the upper and lower wall surfaces of the card receiving slot 33 have protrusions 39 contacting the guard regions 9b in the optical memory card 8 in order to protect the data storage region 9a in the optical memory card 8 from being fretted when the operator inserts the optical memory card 8 into the card receiving slot 33.

Figure 11:
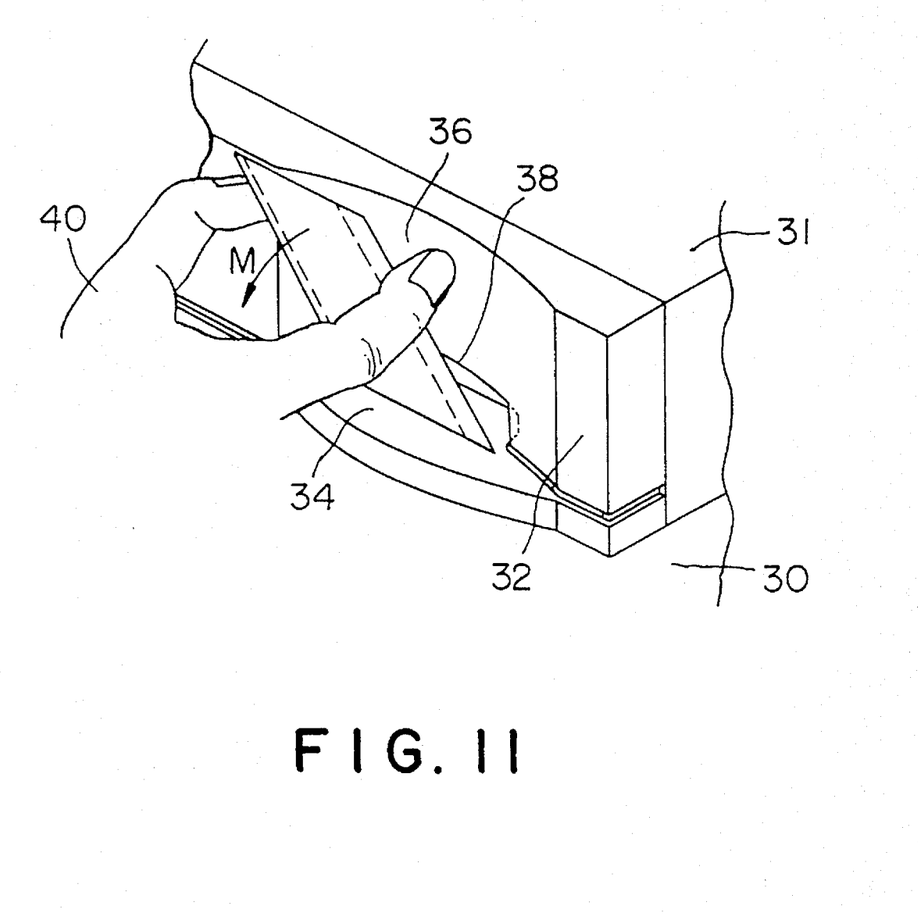
FIG. 11 is an illustration of a state of inserting the optical memory card into a card receiving slot of the information recording and reproducing apparatus of FIG. 7.

In operation, the operator, as shown in FIG. 11, approaches the optical memory card 8 from above the card receiving slot 33 down to the card receiving slot 33 in front of the front panel 32 on the apparatus mounted on the mounting surface 30. The operator then contacts the front end of the optical memory card 8 with the upper surface 35 of the card receiving plate 34. The operator then moves the optical memory card 8 in the direction of the arrow M and orients the optical memory card 8 along the axis of the card receiving slot 33.

In the second embodiment, since the front panel 32 includes the card receiving plate 34, the operator approaches the optical memory card 8 from above the card receiving slot 33 down to the card receiving slot 33 in front of the front panel 32 and contacts the front end of the optical memory card 8 with the upper surface 35 of the card receiving plate 34. This eliminates the need for a parallel movement of the optical memory card 8 to the mounting surface 30 for inserting it into the card receiving slot 33. This also prevents a hand or fingers of the operator holding the optical memory card 8 from contacting the mounting surface 30 and facilitates smooth insertion by the operator of the optical memory card 8 into the card receiving slot 33.

In addition, since the upper edge line of the card receiving slot 33 swells upward and the upper bevelled surface 38 is concave, this arrangement protects the data storage region 9a in the optical memory card 8 from being fretted due to a friction between the data storage region 9a the upper edge line of the Card receiving slot 33.

The present invention is not rigidly restricted to the embodiments described above. It is to be understood that a person skilled in the art can easily change and modify the present invention without departing from the scope of the invention defined in the appended claims.

What is claimed is:

1. Apparatus for recording and reproducing information, comprising:

a chassis;

a main guide rail and an auxiliary guide rail spaced on an upper surface of said chassis, said main guide rail and said auxiliary guide rail respectively having circular cross sections and cylindrical surfaces;

a card carriage capable of retaining an optical memory card, said card carriage being mounted on said main and auxiliary guide rails and linearly movable along said main and auxiliary guide rails;

a main guide beating and an auxiliary plain bearing for supporting said card carriage;

a head carriage movable perpendicularly to the direction of a movement of said card carriage; and an optical recording and reproducing head, fixedly mounted on said head carriage, for recording and reproducing data into and out of the optical memory card.

wherein the axis of said auxiliary guide rail is positioned in the same plane as the axis of said main guide rail, the axis of said auxiliary guide rail being oblique at a predetermined very small angle to the axis of said main guide rail.

the main guide bearing has a round cylindrical bearing surface fitting the cylindrical surface of the main guide rail, and the auxiliary plain beating has a beating bore having a slot-shaped cross section, opposite edge surfaces of the bearing bore of the auxiliary beating being in contact with the cylindrical surface of said auxiliary guide rail, the auxiliary guide rail contacting the auxiliary plain beating at a point that varies laterally along the opposite edge surfaces of the bearing bore as the card carriage moves along the guide rails to prevent linear local abrasion.

2. The apparatus as recited in claim 1, wherein the auxiliary bearing has a U-shaped bearing surface the opposite portions of which are in contact with the cylindrical surface of the auxiliary guide rail.

3. Apparatus for recording and reproducing information, comprising:

a chassis;

main and auxiliary guide rails, each of uniform cylindrical configuration along the length thereof, mounted on the chassis and extending along axes forming a predetermined very small angle greater than 0° therebetween;

a card carriage for an optical memory card, mounted for linear movement along the main and auxiliary guide rails and having a main bearing with a bearing surface of circular cross-section therein for receiving the main guide rail and an auxiliary bearing with a bearing surface of elliptical cross-section therein for receiving the auxiliary rail, contract of an upper surface portion of the auxiliary guide rail with an upper portion of the bearing surface of elliptical cross-section of the auxiliary bearing varying laterally along the upper portion of the bearing surface of elliptical cross-section as the card carriage moves linearly along the main and auxiliary guide rails;

a head carriage movable perpendicularly to a direction of linear movement of the card carriage; and an optical recording and reproducing head mounted on the head carriage, for recording data into and reproducing data out of an optical memory card on the card carriage.

4. The apparatus as recited in claim 3, wherein the beating surface of the auxiliary bearing has opposite, relatively flat upper and lower surfaces joined by opposite curved side surfaces, and contact of upper and lower surface portions of the auxiliary guide rail with the opposite, relatively flat upper and lower surfaces varies laterally across such surfaces as the card carriage moves linearly along the main and auxiliary guide rails.

* * * * *